E. S. STIMPSON.
Loom-Temples.

No. 139,929.  Patented June 17, 1873.

Witnesses.  Edward S. Stimpson.
  by his attorney

UNITED STATES PATENT OFFICE.

EDWARD S. STIMPSON, OF HOPEDALE, MASSACHUSETTS, ASSIGNOR TO DUTCHER TEMPLE COMPANY, OF SAME PLACE.

IMPROVEMENT IN LOOM-TEMPLES.

Specification forming part of Letters Patent No. 139,929, dated June 17, 1873; application filed May 9, 1873.

*To all whom it may concern:*

Be it known that I, EDWARD S. STIMPSON, of Hopedale, of the county of Worcester and State of Massachusetts, have invented a new and useful Improvement in Loom-Temples; and do hereby declare the same to be fully described in the following specification and represented in the accompanying drawings, of which—

Figure 1:
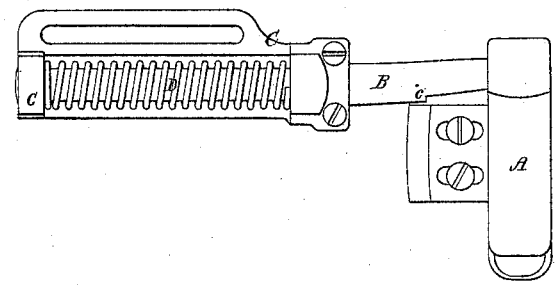
Figure 2:
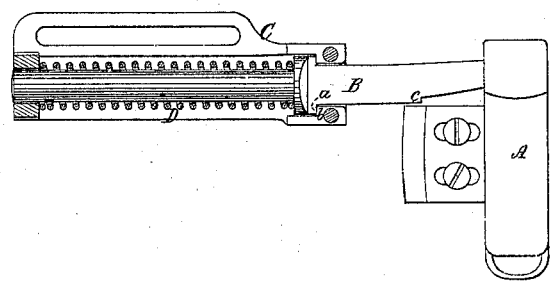

Figure 1 denotes a top view of a "Dutcher loom-temple" provided with my invention. Fig. 2 is a horizontal section of the shank and stand of such temple.

It occasionally happens that it becomes desirable to retract a temple for purposes well known to weavers, such retraction being accomplished by manual power, and the retention of the temple so retracted being effected by a movable catch. A temple provided with such a movable catch is shown in Letters Patent No. 97,895, dated December 14, 1869, granted to the Dutcher Temple Company. The said catch generally has to be moved by one hand of a person, while the other is employed in pulling back the temple; but with my present improvement all the weaver has to do to effect back-latching of the temple is to pull it backward the necessary extent, the strain of the cloth on the temple sufficing to move it laterally in a manner to effect the latching of it.

In carrying out my invention I provide the slide bar or shank of the temple with an auxiliary shoulder arranged on its inner side to act with the stand-shoulder in holding back the temple.

In the drawing, A denotes the temple-case, which is to be of the usual construction, and provided with a toothed roller. This case is projected from a shank or slide bar, B, sustained by a stand, C, in manner to enable the bar to slide longitudinally within such stand. A helical spring, D, applied to the slide and stand, serves to advance the slide until a stop or shoulder, *a*, thereof may bring up against a stop or shoulder, *b*, which, in this instance, constitutes the shoulder with which the auxiliary shoulder *c* of the slide is to operate in holding the temple back.

The said auxiliary shoulder *c* I have added to the temple shank or slide, which, in advance of the shoulder, has a width less than the part immediately in rear of the shoulder, all being as shown in the drawings. The back bearing for reception of the cylindrical part of the shank should have a diameter sufficiently larger than the shank to allow of such shank being moved laterally, so as to latch the shoulder *c* upon the shoulder *b* when the two are in a condition to be latched.

From the above it will be seen that on taking hold of the temple-case and drawing it backward until the shoulder *c* may pass rearward beyond the shoulder *b*, the strain of the cloth on the temple will at once draw it laterally so as to latch the shoulder *c* upon the shoulder *b*, the two shoulders while in contact operating to hold the temple retracted. By moving the temple outward laterally, so as to cast the shoulder *c* off the shoulder *b*, the spring will at once advance the temple or such and its slide.

I make no claim to a temple with its stand provided with a movable catch, constructed in manner and to operate as shown and described in the patent hereinbefore mentioned; nor do I claim the subject of either of the claims in the application of Warren W. Dutcher filed in the Patent Office May 9, 1873; but

I claim—

The loom-temple provided with the auxiliary stop or shoulder *c* arranged on the inner side of its shank, substantially in manner, and to operate with the stand-shoulder *b* by means of the cloth, and for the purpose set forth.

EDWARD S. STIMPSON.

Witnesses:
W. L. BANCROFT,
F. J. DUTCHER.